UNITED STATES PATENT OFFICE.

WILLIAM S. PACE AND JAMES J. PACE, OF GAINESVILLE, TEXAS.

COTTON-CHOPPER.

No. 926,594.  Specification of Letters Patent.  Patented June 29, 1909.

Application filed September 12, 1907. Serial No. 392,513.

*To all whom it may concern:*

Be it known that we, WILLIAM S. PACE and JAMES J. PACE, citizens of the United States, residing at Gainesville, in the county of Cooke and State of Texas, have invented certain new and useful Improvements in Cotton-Choppers, of which the following is a specification.

Our invention relates to an improvement in cotton choppers, and the object is to arrange the disks or blades so that all the surplus plants will be removed or cut down, and the standing plants left at predetermined intervals apart.

The invention relates to certain other novel features of construction and combinations of parts which will be hereinafter described and pointed out in the claims.

Figure 1:
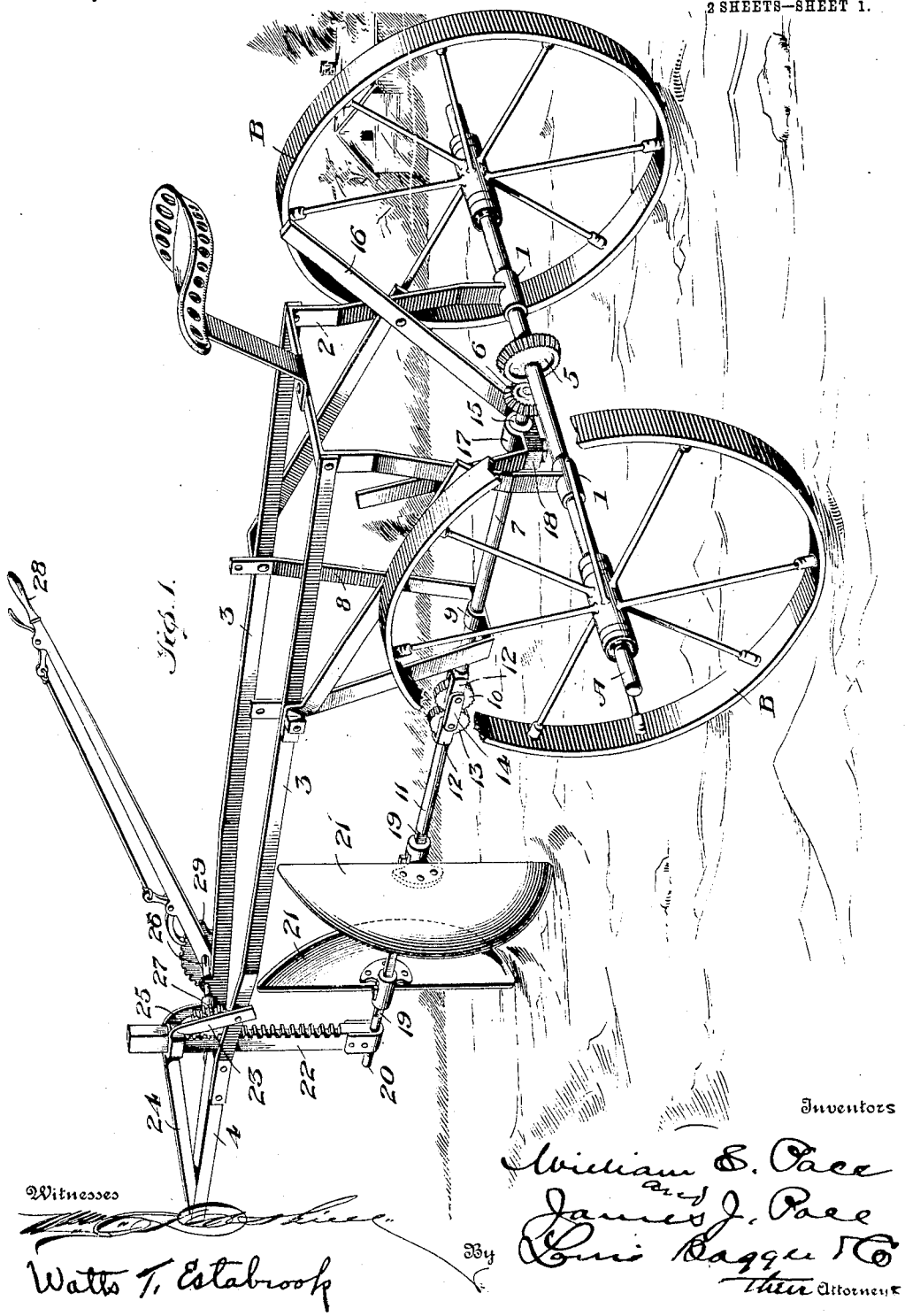
Figure 2:
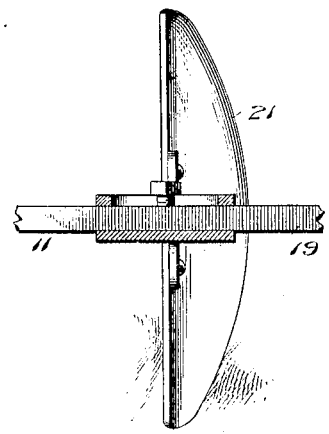
Figure 3:
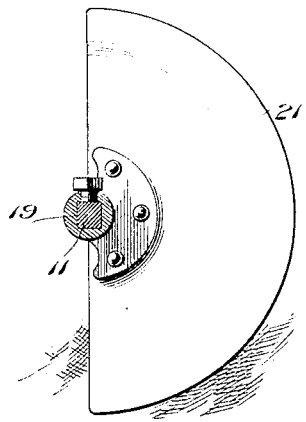
Figure 4:
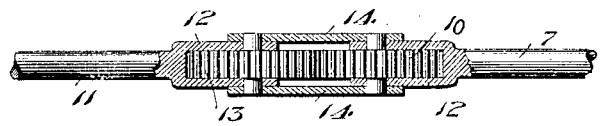

In the accompanying drawings, Figure 1 is a perspective view, Fig. 2 is a fragmentary view in side elevation, Fig. 3 is a cross section and Fig. 4 is a detail.

A represents the axle, and B, B are the wheels. Connected to the axle are couplings 1, 1, to which is secured the upright frame 2, and connected to the frame 2 are bars 3, 3, which are bent inwardly at their forward ends to receive a pole or tongue 4 to which they are secured.

Secured on the axle A, between the couplings 2, is a bevel-gear 5 and meshing therewith is a gear 6 secured on the shaft 7, which shaft is supported by a U-shaped hanger 8 having a bearing 9 formed at the center thereof in which the shaft turns, and the hanger depends from bars 3, 3. The shaft 7 has its forward end forked for the reception of a small gear wheel 10, and the secondary shaft 11, forward of shaft 7, has a similar forked end 12 for a gear 13. The two shafts are connected together by plates 14, 14 whereby the two gear wheels 10 and 13 are held in engagement thus producing a flexible connection. The rear end of shaft 7 is journaled in a bearing 15 held in boxes 17 and 18 in the lower end of the V-shaped hanger 16 which latter is secured to frame 2. The shaft 11 is squared for a short distance as at 19, and rounded at the end 20. Adjustable couplings are mounted on the squared portion of the shaft 11, and are secured to disks 21, 21, which are preferably made semi-circular, and the disks are so arranged with respect to each other that they are on opposite sides of the shaft and one in advance of the other. To the forward end of the shaft 11 is connected a rack-bar 22, and a strap-iron 23 is secured to one of the bars 3 passing around the bar to hold it slidably in a vertical position. A brace 24 extends from this iron 23 to the tongue 4. Connected to the brace 24 is an arm 25, and this arm carries one end of the shaft 26 which is journaled at its other end in one of the bars 3, and on the shaft is mounted a gear 27 adapted to engage the rack-bar 22, whereby the bar is moved up and down as the lever 28, which is connected to the shaft 26, is moved rearward or forward over the segment 29, thereby lifting the blades off the ground or lowering them for the cutting operation.

It will be seen that by having the disks semi-circular and one of them ahead of the other, during their rotation they will cut out only the plants the blade of the disk strikes during its revolution. In other words, the disk does not have a continuous cut, and by having the disks spaced apart, the plants between them are left standing.

It is evident that many slight changes might be made in the form and arrangement of the several parts described without departing from the spirit and scope of our invention, and hence we do not wish to limit ourselves to the exact construction herein set forth, but:—

Having fully described our invention and what we desire to secure by Letters Patent, is:—

1. In a cotton chopper the combination with a frame, axle and flexible shaft, of semi-circular disks secured transversely on opposite sides of the shaft one in advance of the other.

2. In a cotton chopper the combination with a frame, axle and flexible shaft, of semi-circular disks secured transversely on opposite sides of the shaft one in advance of the other, and means for raising and lowering the section of the shaft having the disks thereon, and means for locking said shaft in the position to which it is elevated.

3. In a cotton chopper, the combination with a frame, of an axle, a bevel-gear mounted on the axle, a flexible shaft, a gear on the flexible shaft adapted to engage the bevel-gear, semi-circular disks mounted on the shaft, a rack-bar connected to the shaft, and means for engaging the rack-bar whereby the disks are raised and lowered.

4. In a cotton chopper, the combination with a frame, an axle, and a bevel-gear mounted on the axle, a flexible shaft, a gear on the flexible shaft adapted to engage the bevel-gear, means connected to the frame for supporting the flexible shaft, disks mounted on the shaft, a rack-bar connected to the shaft and means engaging the bar for raising and lowering the disks.

In testimony whereof we affix our signatures in presence of two witnesses.

WILLIAM S. PACE.
JAMES J. PACE.

Witnesses:
W. H. McCLALLUM,
CHAS. M. BUCKINGHAM.